United States Patent
Sweeney et al.

(10) Patent No.: US 8,509,752 B2
(45) Date of Patent: *Aug. 13, 2013

(54) METHOD AND SYSTEM FOR CONDITIONALLY LIMITING COMMUNICATIONS

(75) Inventors: Jeffrey M. Sweeney, Olathe, KS (US); Jennifer D. Doyle, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/525,914

(22) Filed: Jun. 18, 2012

(65) Prior Publication Data

US 2012/0260308 A1    Oct. 11, 2012

Related U.S. Application Data

(63) Continuation of application No. 12/002,422, filed on Dec. 17, 2007, now Pat. No. 8,229,404.

(51) Int. Cl.
*H04M 3/42* (2006.01)

(52) U.S. Cl.
USPC ........................... 455/414.1; 455/415

(58) Field of Classification Search
USPC ........... 455/414.1, 95, 90.1–90.3, 415, 550.1, 455/552.1, 556.2, 558
See application file for complete search history.

(56) References Cited

U.S. PATENT DOCUMENTS

| | | | |
|---|---|---|---|
| 6,115,596 A | 9/2000 | Raith et al. | |
| 6,115,602 A | 9/2000 | Dee et al. | |
| 6,975,853 B2 | 12/2005 | Fang et al. | |
| 7,027,801 B1 * | 4/2006 | Hall et al. | 455/412.1 |
| 7,548,754 B2 | 6/2009 | Shivaram et al. | |
| 7,624,165 B2 | 11/2009 | Tucker et al. | |
| 7,715,820 B2 * | 5/2010 | Shin | 455/404.1 |
| 7,725,103 B2 | 5/2010 | Boss et al. | |
| 7,756,545 B2 * | 7/2010 | Roundtree | 455/550.1 |
| 8,229,404 B2 | 7/2012 | Sweeney et al. | |
| 2002/0128033 A1 | 9/2002 | Burgess | |
| 2003/0045279 A1 | 3/2003 | Shostak | |
| 2004/0030719 A1 * | 2/2004 | Wei | 707/104.1 |
| 2004/0210479 A1 * | 10/2004 | Perkowski et al. | 705/14 |
| 2006/0073884 A1 * | 4/2006 | Walker et al. | 463/25 |
| 2007/0004377 A1 * | 1/2007 | Medford et al. | 455/404.1 |
| 2007/0072593 A1 | 3/2007 | Huliyapur Math | |
| 2007/0190995 A1 | 8/2007 | Wang et al. | |
| 2007/0206747 A1 | 9/2007 | Gruchala et al. | |
| 2008/0037720 A1 * | 2/2008 | Thomson et al. | 379/88.01 |
| 2008/0070697 A1 | 3/2008 | Robinson et al. | |
| 2008/0088639 A1 | 4/2008 | Thoresson | |
| 2008/0146200 A1 * | 6/2008 | Martin et al. | 455/413 |
| 2009/0041222 A1 | 2/2009 | Guven | |

* cited by examiner

*Primary Examiner* — Kamran Afshar
*Assistant Examiner* — Marisol Fahnert
(74) *Attorney, Agent, or Firm* — Patton Boggs LLP

(57) ABSTRACT

A server, system, and method configured to limit communications. The server includes a processor for executing a set of instructions and a memory for storing the set of instructions. The set of instructions are executed to receive a list of one or more communicating parties that are authorized to communicate with a user at any time, receive a selection to limit communications, determine whether an identifier associated with a communicating party is in the list in response to processing a communication, and connect the communication to a communications device in response to determining the identifier is in the list.

20 Claims, 6 Drawing Sheets

| Graphical User Interface | | 600 |
|---|---|---|

☑ Add Identifier Designator 608

| 602 | Username | Dswen |
| 604 | Password | ********* |
| 606 | Customer/Company ID | 24548 |

Identifier ▼
- Phone Number
- IP Address
- Area Code
- Username
- Email address

616 {
- ☐ Initiate when out of home area
- ☑ Initiate after 6 p.m. daily
- ☑ Initiate on weekends
- ☑ Initiate for cell phone and home phone
}

| 610 Category | 612 Caller | 614 Name |
|---|---|---|
| Home | 1-214-999-9999 | B. Simpson |
| Work | 1-214-997-9997 | Bob McKenzie |
| Cell | 1-469-999-9999 | D. McKenzie |
|  | 1-214-999-9999 | Big Boss |
| Home | 208.13.3.4859 | Manager - Smith |
| Work | 1-214-999-1234 | H. Simpson |
| Cell | 1-208-999-9999 | J. Sweeney |
| Work | 128.13.3.4859 | J. Sweeney |
| Personal | jj@xabdzi.com | C. Soli |
| Personal | frenchy | O. Collin |
| Family | 307 or 208 | Jones Family Members | ically limiting communications quickly.

METHOD AND SYSTEM FOR CONDITIONALLY LIMITING COMMUNICATIONS

CROSS-REFERENCE TO RELATED APPLICATIONS

This application is a Continuation of U.S. patent application Ser. No. 12/002,422 filed Dec. 17, 2007 now U.S. Pat. No. 8,229,404 entitled METHOD AND SYSTEM FOR CALL GATING the entire teachings of which are incorporated herein.

BACKGROUND

The use and development of communications has grown nearly exponentially in recent years. The growth is fueled by larger wired and wireless networks with more reliable protocols and better communications hardware available to both service providers and consumers. Based on these drastic improvements, users have nearly unlimited access to communications. In many cases, the different forms of electronic communications may begin to monopolize a user's time, preventing him or her from accomplishing other tasks, projects, goals, and work in which the user is involved.

Many users resort to turning off or ignoring their phone or other communications devices. In other cases, the user may use a service or feature, such as do-not-disturb. Unfortunately, such solutions are over encompassing, preventing the user from receiving communications, such as critical or emergency information, they would have received regardless of their present workload or status. As a result, users are forced to either broadly ignore communications with the potential of missing important information or review each incoming call to determine the relative importance at the expense of time and effort.

SUMMARY

One embodiment provides a server, system, and method configured to limit communications. The server may include a processor for executing a set of instructions and a memory for storing the set of instructions. The set of instructions may be executed to receive a list of one or more communicating parties that are authorized to communicate with a user at any time, receive a selection to limit communications, determine whether an identifier associated with a communicating party is in the list in response to processing a communication, and connect the communication to a communications device in response to determining the identifier is in the list.

Another embodiment provides a method for limiting communications. A list of one or more communicating parties that are authorized to communicate with a user at any time may be received. A selection to limit communications may be received. An identifier associated with a communicating party may be determined to be on the list in response to receiving a communication. The communication may be connected to a communications device in response to determining the identifier is on the list.

Another embodiment may provide a communication system for limiting communications include a communication system for call gating. The communication system may include a server configured to receive incoming communications from a communications network. The server may also include logic configured to receive a list of one or more communicating parties that are authorized to communicate with a user at any time, receive a selection to limit communications, determine whether an identifier associated with a communicating party is in the list in response to processing a communication, reject the communication in response to conditional criteria set by the user and determining the identifier is not on the list; and connect the communication to a communications device in response to determining the identifier is in the list. The communications device in communication with the server may be configured to receive at least a portion of the communications from the server.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Illustrative embodiments provide a system and method for call gating. A user may establish a number of individuals or devices that are allowed to call or communicate with a user. The callers are saved in one or more lists. Each caller may be associated with one or more identifiers that allow the caller to communicate with the user. The identifiers may include phone numbers, caller identification information, user names, nicknames, email addresses or other information used for purposes of communication. The user may select to limit incoming communications to those individuals on the preferred caller list by entering a code or providing other input to a communications device, such as a cell phone. Once activated, all calls that are received from callers not included on the list are connected to voicemail or handled according to other instructions of the user.

In one embodiment, the caller may be prompted to provide input specifying that the communication is an emergency for ensuring that the caller is able to reach the user during an emergency. For example, a voice prompt may prompt a caller to enter a numeric code if the telephone call is an emergency, thereby allowing the call to be connected to the user. The illustrative embodiments allow a user to limit the calls received at will to avoid unnecessary communications and to encouraging better productivity at the user's request.

Figure 1:
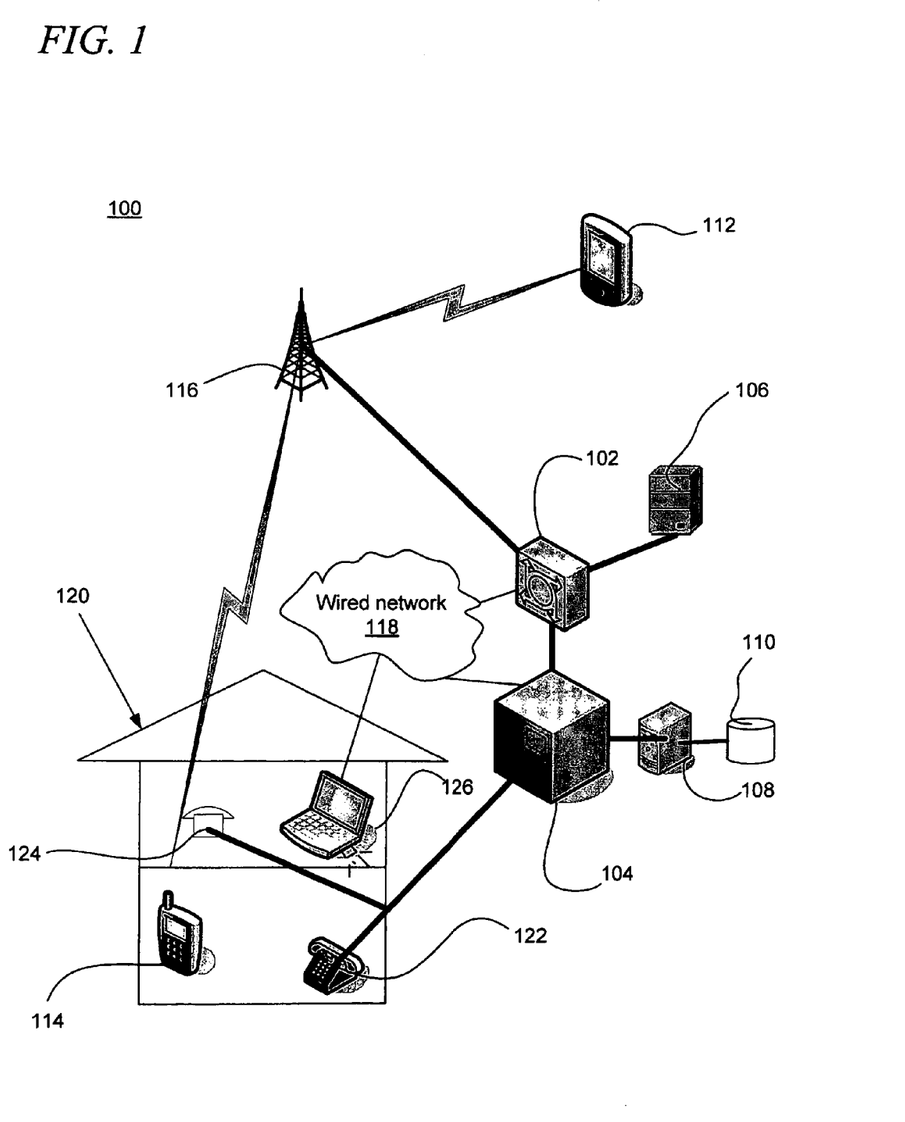
FIG. 1 is a pictorial representation of a communications system in accordance with an illustrative embodiment.

FIG. 1 is a pictorial representation of a communications system in accordance with an illustrative embodiment. The communication system 100 of FIG. 1 includes various elements used for wireless and wired communication. The communications system 100 includes a mobile switching center 102, a local exchange 104, voicemail systems 106 and 108, a database 110, wireless devices 112 and 114, a transmission tower 116, a wired network 118, a home 120, home telephones 122 and 124, and a client 126. In one embodiment, the different elements and components of the communications system 100 communicate using wireless communications including satellite connections or hardwired connections, such as fiber optics, T1, cable, DSL, high speed trunks, and telephone lines.

The wireless devices 112 and 114 may communicate with the transmission tower 116 using communications protocols, such as time division multiple access (TDMA), code division multiple access (CDMA), global systems for mobile (GSM) communications, personal communications systems (PCS), WLAN, WiMAX, or other frequently used cellular and data communications protocols and standards. The wireless devices 112 and 114 may include cellular phones, Blackberry®, personal digital assistances (PDA), laptops, evolution data optimized (EDO) cards, multi-mode devices, and other wireless communication devices and elements.

Communications within the communications system 100 may occur on any number of networks which may include wireless networks, data or packet networks, private networks, publicly switched telephone networks (PSTN), and the wired network 118. The networks of the communications system 100 may represent a single communication service provider or multiple communications services providers. The features of the embodiments may be implemented by one or more elements of the communications system 100 independently or as a networked implementation.

In one embodiment, the mobile switching center 102, voicemail system 106, and transmission tower 116 are part of a wireless network that is operated by a wireless service provider. For example, the control signals and operational features may be performed by the mobile switching center 102 and the wireless signals may be broadcast from the transmission tower 116 to the wireless devices 112 and 114. The wireless network may include any number of systems, towers, servers, and other network and communications devices for implementing the features and performing the methods herein described.

The mobile switching center (MSC) 102 may be a switch used for wireless call control and processing. The MSC 102 may also serve as a point of access to the local exchange 104. The MSC 102 is a telephone exchange that provides circuit switched calling and mobility management and may also provide GSM or PCS services to the wireless devices 112 and 114 located within the area the MSC 102 serves. The MSC 102 may include a home locator record (HLR) and virtual locator record (VLR) that may be used to implement different features of the illustrative embodiments. The voicemail system 106 may be an integrated part of the MSC 102 or alternatively may be an externally connected device.

In one embodiment, the voicemail system 106 may include an integrated database for storing customer and usage information and data. In another embodiment, the voicemail system 106, a server, or other intelligent network device may store user preferences and implement the call gating, as further described herein. The user may interact or send and receive data, information, and commands through the telephones 122 and 124, wireless device 112 and 114, or the client 126. The mobile switching center 102 and voicemail system 106 may include any number of hardware and software components. In one embodiment, the MSC 106 is an advanced intelligence network device with software modules equipped to perform call gating features and functions.

The local exchange 104 and MSC 102 communicate using a signal control protocol, such as a signaling system number 7 (SS7) protocol. The SS7 protocol is used in publicly switched networks for establishing connections between switches, performing out-of-band signaling in support of the call-establishment, billing, routing, and implementing information-exchange functions of the publicly switched network 134. The local exchange 104 may be owned and operated by a local exchange carrier that provides standard telephone service to any number of users. In one embodiment, the local exchange 104 may be a class 5 switch that is part of the network systems of the local carrier. The local exchange 104 may include or may be connected to the voicemail system 106. However, the local exchange 104 may also be a Digital Subscriber Line Access Multiplexer (DSLAM), Internet Protocol (IP) gateway, base station, or any other suitable network access point.

The local exchange 104 may be a wire-line switch or public exchange using time domain multiplexing to provide telecommunications services to a particular subscriber or groups of subscribers. The local exchange 104 may be located at a local telephone company's central office, or at a business location serving as a private branch exchange. The local exchange 104 may provide dial-tone, calling features, and additional digital and data services to subscribers, such as home phones 122 and 124. The local exchange 104 may also enable VoIP communication of the home telephones 116 and 118 through a data network VoIP works by sending voice information in digital form in packets, rather than in the traditional circuit-committed protocols of the publicly switched network.

The communications system 100 may further include any number of hardware and software elements that may not be shown in the example of FIG. 1. For example, in order to facilitate VoIP communications, the communications system and the MSC 102 and local exchange 104 in particular, may include application servers, media servers, service brokers, call agents, edge routers, gateways (signaling, trunking, access, sub, etc.), IP network service providers, adapters, exchanges, switches, users, and networks. The voicemail system 108 is similar to the voicemail system 106 except that it is equipped to handle voicemail for landline customers rather than wireless customers. The local exchange 104 or other components of a wire line network, such as a data, PSTN, VoIP, or other wired network may implement the call gating features and perform the methods herein described.

The MSC 102 and the local exchange 104 may include an authentication space. The authentication space may be a partition of the server or other storage designated by the communications service provider. The authentication space may validate that a user or device, such as client 126, is allowed to authorize the MSC 102, local exchange 104, or corresponding voicemail system 106 and 108 to set preferences, implement changes, review information, or perform other updates. For example, a user may be first required to provide a secure identifier, such as a user name, password, or other authentication code or hardware interface, to verify the user is authorized to make changes within the authentication space.

The authentication information may be used to create a secure connection between the client and the MSC 102 and the local exchange 104. The secure connection may be a virtual private network tunnel, an encrypted connection, firewall, or other form of secured communications link. The MSC 102 and local exchange 104 may use any number of gateways, proxies, applications, or interfaces for allowing the client 126 to the MSC 102 and local exchange 104 through the wired network 118. Alternatively, the client 126 may use a wireless network or other network to access the MSC 102 and local exchange 104. The MSC 102 and local exchange 104 may use a host client application for communicating with numerous clients.

The home 120 is an example of a dwelling or residence of a person or group that may use any number of communications services. The home 120 is shown as a residence in the illustrated example, however, the home 120 may also be an office, business, or other structure wired or otherwise suitably equipped to provide telephone, data, and other communication services to one or more customers. In one embodiment, the home 114 is equipped with multiple communication devices, including home telephones 122 and 124 and client 126. The home telephones 122 and 124 may be standard devices that provide dialing and voice conversation capabilities. Home telephone 122 may be integrated in any number of other devices or may be used in different forms. For example, the home telephone 122 may be part of a refrigerator. In another embodiment, the home telephone 124 may be integrated with a personal computer, such as client 126. The communications services accessible from the home telephones 122 and 124 may include standard telephone service or VoIP telephone service. The home telephones 122 and 124 may be VoIP telephones or may be standard telephones that include a modem and/or VoIP adapters for enabling VoIP communications.

The client 126 may be a personal computer for performing and executing programs and instructions and accessing the wired network 118. However, the client 126 may be any computing devices suitable for communicating with the wired network 118. The wired network 118 may be a fiber optic, cable, or telephone network or other wired network suitable for communication over a hard wired connection with the client 126. In one embodiment, the home 120 may include a wireless router, adapter, switch, hub, or other suitable interface that allows the client 126 to communicate with the wired network 118. The MSC 102 and local exchange 104 may use a graphical user interface (GUI), such as website or program accessible from the client 126 in order to enter and receive input preferences for a preferred caller list or other preferences applicable to call gating.

In an illustrative embodiment, the user may stipulate identifiers for callers on a preferred caller list, provide user input, or receive a call or communicate using devices, such as wireless devices 112 and 114, home telephones 122 and 124, and client 126. At any time, a user may select to enable, order, initiate, configure, reconfigure or otherwise establish call gating and communications parameters as herein described.

The user may activate the preferred caller list in a number of ways. For example, the user may use a command that informs a function trigger of a device or the device itself, such as the MSC 102, local exchange 104, voicemail systems 105 and 106, wireless device 112 and 114, home telephones 122 and 124, or client 126, to filter or restrict the calls or communications that may be received. In one example, the user may submit a command to activate the preferred caller list by dialing *2 on the home telephone 122. The command may also be a password, voice activated, time activated, preset by user selection or any other suitable option, setting, command, or user input. In one embodiment, the user may have established multiple preferred caller lists with different callers that may be activated using separate commands.

In one embodiment, the applicable communications device may initiate call gating thereby activating the preferred caller list using any number of conditional criteria. The conditional criteria may be stored in user preferences, logic, or integrated as part of the preferred caller list. In one embodiment, the conditional criteria may specify days, times of the day, locations, events, telephone settings or configurations, or other information that triggers activation of call gating for one or more specified devices. The day and time may detail a specified time period for activating the call gating feature. The location may be determined based on the equipment or registry where a wireless device is being utilized or using any number of global positioning or radio triangulation methods. For example, conditional criteria may be established for each of the user's communications devices so that a user's home telephone implements call gating on the weekend using a first preferred caller list and the user's wireless device implements call gating using a second preferred caller list.

A set of conditional criteria may be set for each of the communications devices, preferred caller lists, or applicable users of communications services. In another example, a communications device may activate one of a set of preferred caller lists based on location. As a result, when it is determined that the user is at work or the vicinity of work a first preferred caller list may be activated for the user's wireless device, when it is determined that the user is at home a second preferred caller list may be implement. The functions of the preferred caller list may be implemented automatically based on the pre-set conditions that the user may establish using any number of interface devices.

In another example, a communications device may implement a preferred caller list based on a determination that the user is in a meeting. For example, the communications device may have access to the user's electronic calendar and based on a determination the user is in a meeting a preferred caller list designated for meetings may be activated. In another embodiment, the user may utilize multiple communications device and one may set to forward calls or communications from a first device to a second device. A preferred caller list for call forwarding may be activated when the first device is set to forward to the secondary device for ensuring that only desired callers are able to reach the user despite the implementation of the call forwarding.

Figure 2:
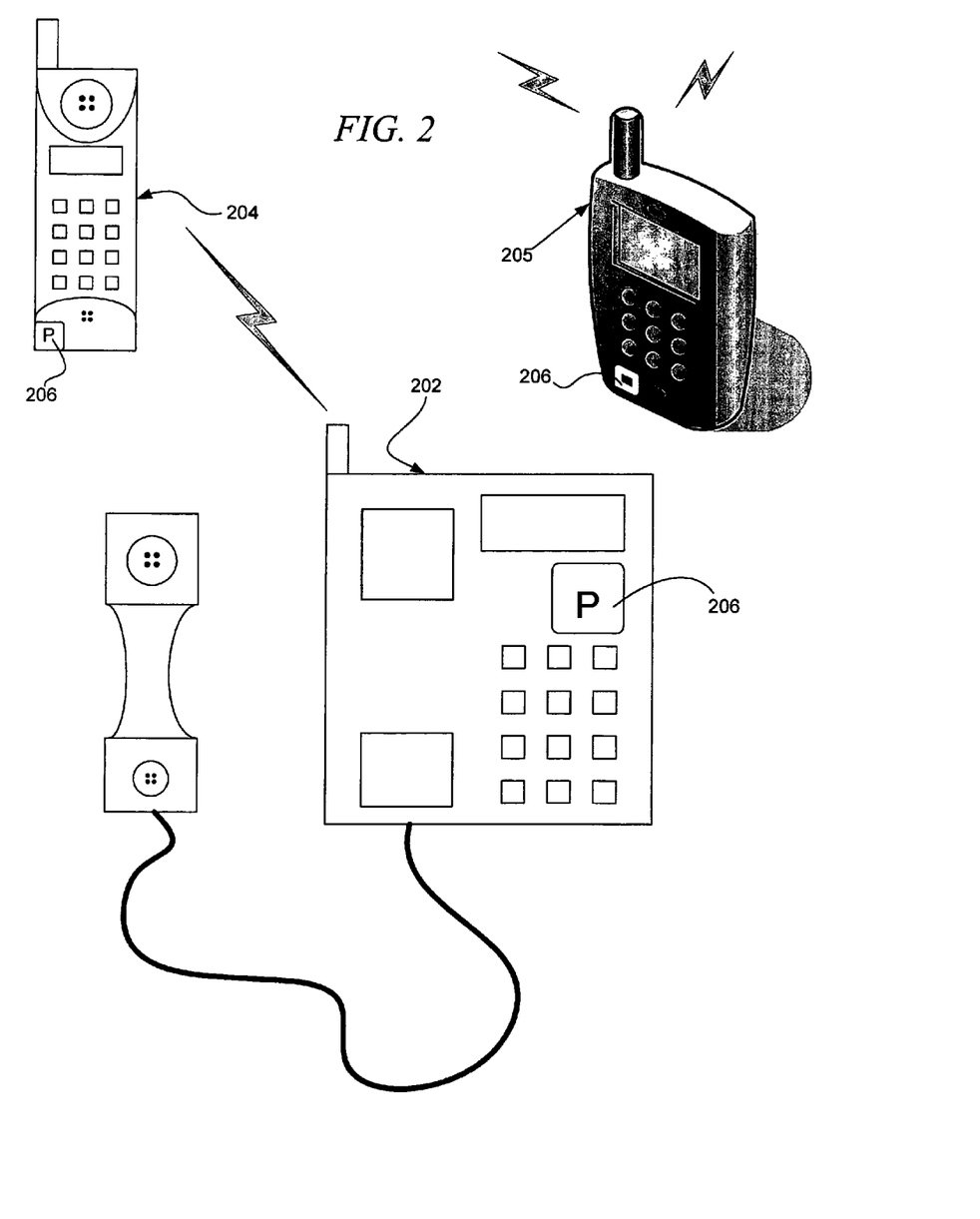
FIG. 2 shows examples of communications devices in accordance with the illustrative embodiments of the present invention.

FIG. 2 shows examples of communications devices in accordance with the illustrative embodiments of the present invention. FIG. 2 includes a standard telephone 202, a cordless telephone 204, and a wireless device 205. The standard telephone 202, the cordless telephone 204, and wireless device 205 may include a gating button 206. The standard telephone 202 and cordless telephone 204 are particular implementations of the standard telephone 122 of FIG. 1. The wireless device 205 is a particular implementation of the wireless device 114 of FIG. 1.

The gating button 206 may be an interface that allows the user to send a signal or call gating command to a class 5 switch, MSC, or other communications device for activating call gating to the applicable device. The gating button 206 may be a graphical user interface, touch screen, voice command, scroll wheel, or other input device that generates the command signal to implement call gating when pressed, selected, or otherwise activated. The gating button 206 may implement a feature within the standard telephone 202, cordless telephone 204, or the wireless device 205. Alternatively, the gating button 206 may send a signal to an externally connected device, such as a class 5 switch, MSC, or server to activate the preferred caller list.

The standard telephone 202 and cordless telephone 204 are telephones that operate in conjunction with a publicly switched network and class 5 switch. In another embodiment, the communication service accessible from the standard telephone 202 and the cordless telephone 204 may be part of a voice over Internet protocol (VoIP) telephone service. The standard telephone 202 and cordless telephone 204 are provided dial tone through a wired connection to a home, business or other location in which the standard telephone 202 and cordless telephone 204 are located. The wireless device 205 may work in connection with one or more wireless networks.

Figure 3:
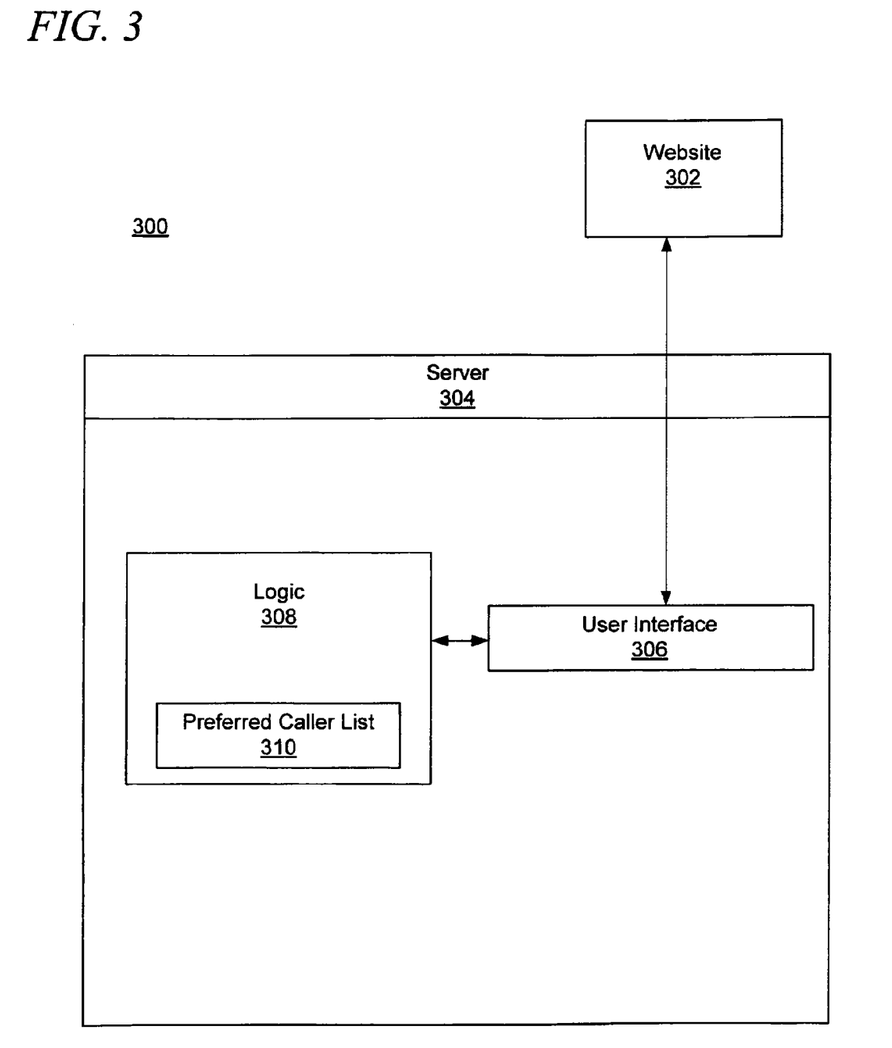
FIG. 3 is a block diagram of an interfacing system for setting a preferred caller list in accordance with an illustrative embodiment.

FIG. 3 is a block diagram of an interfacing system for setting a preferred caller list in accordance with an illustrative embodiment. FIG. 3 illustrates an embodiment of an interfacing system 300. The interfacing system 300 may include various hardware and software elements which may include a website 302, and a server 304. The server 304 may include a user interface 306, logic 308, and a preferred caller list 310.

The server 304 may be a particular implementation of the communications or computing devices of the communication system 100 of FIG. 1. Configurations of the server 304 received from the website 302 may be applicable to both wireless and hard-wired networks. The components of the server 304 may also be part of a communications device, such as a cell phone, to implement call gating locally for the user. In one embodiment, the preferences of the logic 308 and preferred caller list 310 may be periodically transmitted to the applicable communications device. In one embodiment, call gating may be implemented for a VoIP work phone and a personal cellular telephone of the user by entering a single command. Similarly, the user may set preferences to activate the preferred caller list 310 for specified communications devices.

The website 302 is a particular implementation of an interface that may be displayed by a remote client, wireless device, or other device to a user. The website 302 may be generated or displayed by the user interface 306. The user interface 306 may manage input and feedback received from the user through the website 302. In one embodiment, user input received through the website 302 and user interface 306 may be used by the logic 308 to activate the preferred caller list 310. For example, the user may enter a password, such as PCL on the website or a numeric code such as *111 to activate the preferred caller list 310 for one or more communications devices. The website 302 may also be used to receive conditional criteria for initiating, implementing and terminating call gating.

The logic 308 represents digital logic, instructions, or a module that limit communications to a device based on the preferred caller list 310. However, the logic 308 may any software or hardware construct including fully programmable gate arrays (FPGA) suitable to implement the features of the illustrative embodiments.

The logic 308 may be configured to determine an identifier associated with the caller. The logic 308 may extract a phone number, caller identification information, a user name, IP address or other information to compare that information with the identifiers listed on the preferred caller list 310. The preferred caller list 310 or list is a data file listing the callers that are allowed to contact the caller when call gating is activated. However, the preferred caller list 310 may be any document, spreadsheet, instructions, fields, or information that stores the information regarding callers and identifiers associated with each of the callers. The preferred caller list 310 may include identifiers for communications devices used by family, friends, managers, or other individuals from which the user prefers to receive communications under any circumstance. Activation of call gating is transparent to callers identified by the preferred caller list 310 because their call is processed and connected as would normally occur.

The logic 308 may also be configured to receive feedback from a user during a communication to classify the communication as an emergency. For example, when a caller makes a phone call to the user, the logic 308 may be unable to associate an identifier of the caller with identifiers listed on the preferred caller list 310. The normal result would be for the call to be connected to voicemail or ended. However, the logic 308 may ensure that a message is played to the caller to determine whether the call is an emergency. If the caller self-identifies an emergency situation, then the call is classified an emergency and the logic 308 may allow the call to proceed normally for connection to the user.

The logic 308 may be configured to queue, archive or otherwise store incoming communications, such as test, chat, email, and voicemail messages, from callers that are not listed on the preferred caller list 310, until the user deactivates the preferred caller list or disables the call gating feature. As a result, the user's privacy is enhanced because the user is not bothered or interrupted by incoming communications that do not meet the criteria specified by the preferred caller list 310. Similarly, the user is not require to take the time and effort required to screen communications as they are incoming based on the preset preferences of the logic 308. The logic 308 may also store and implement conditional criteria and user preferences that control how, when, where, and for which devices and preferred caller lists, call gating is utilized. For example, the logic 308 may ensure that call gating occurs on a wireless device only when the user is within a specified location or geographic range. In another example, call gating may be implemented on the user's home phone only on weekends and federal holidays.

Figure 4:
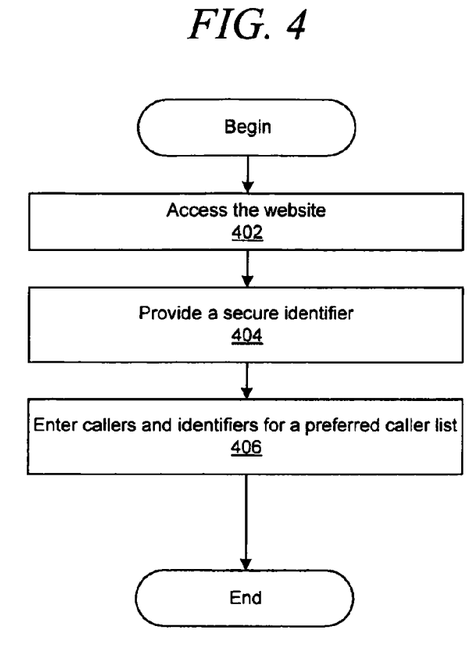
FIG. 4 is a flowchart of a process for receiving a preferred caller list in accordance with an illustrative embodiment.

FIG. 4 is a flowchart of a process for receiving a preferred caller list in accordance with an illustrative embodiment. The process of FIG. 4 may be implemented by a user utilizing a wireless device, remote client, or other communications or computing device.

The process may begin with the user accessing the website (step 402). The user may also be required to select an icon, enter a website of the communications service provider, or open an application. The user provides a secure identifier (step 404). The secure identifier may be a username, password, account number, or other information to identify the user.

Next, the user enters callers and identifiers for a preferred caller list (step 406). In one embodiment, the user may enter the name of the caller and identifiers, such as a phone number associated with each caller. Alternatively, the user may select the caller from a call history or caller identification information to include that caller on the preferred caller list. For example, by selecting the caller identification information, the user may select a caller's name and IP address as the relevant identifiers to be associated with the caller in the preferred caller list.

The user may have any number of preferred caller lists. For example, the user may store a preferred caller list that is applicable to situations in which the user is at work, home, or school. The preferred caller lists may be centrally stored for any number of communications devices. For example, the preferred caller list or a master list may be regularly accessed and managed using a VoIP telephone service, but may similarly be applicable for the user's cell phone.

Figure 5:
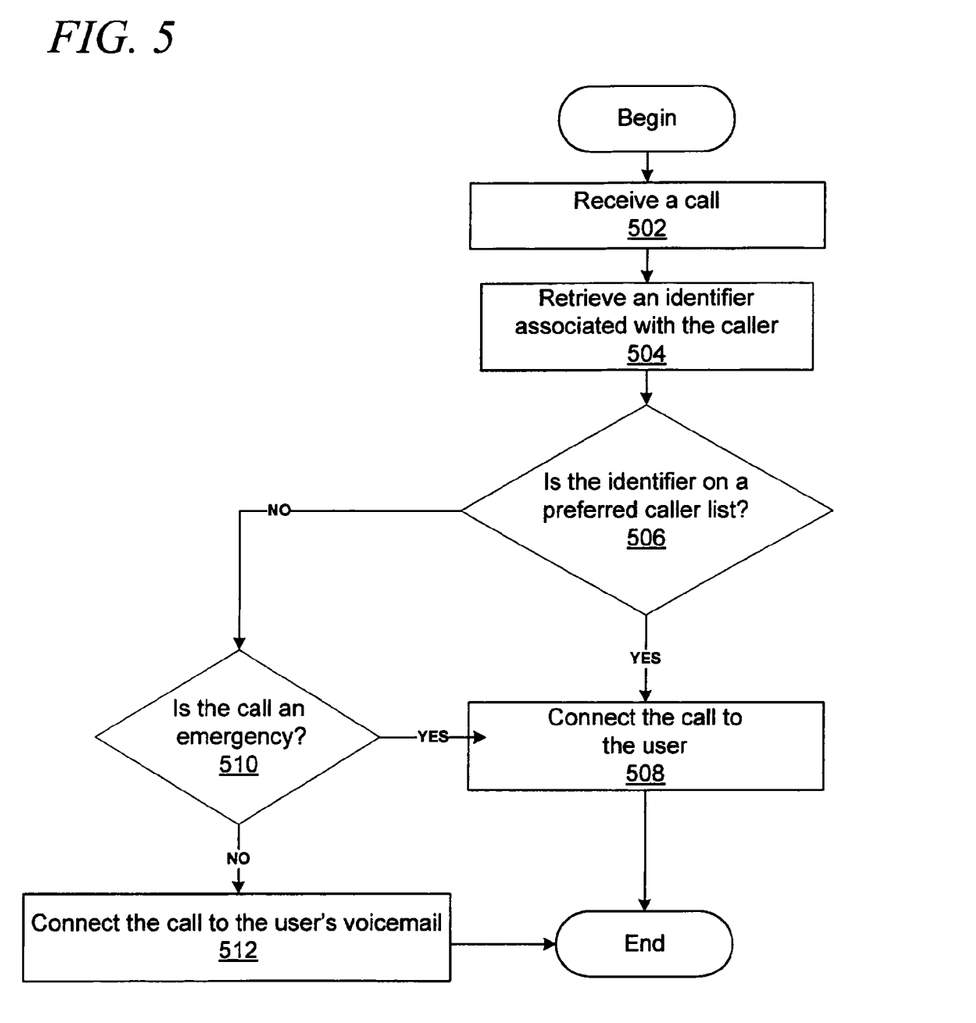
FIG. 5 is a flowchart of a process for implementing a preferred caller list in accordance with an illustrative embodiment.

FIG. 5 is a flowchart of a process for implementing a preferred caller list in accordance with an illustrative embodiment. The process of FIG. 5 may be implemented by a wireless device, MSC, class 5 switch, server, or other component or device of a communications network. The call gating feature or function may have previously been implemented to activate the preferred caller list based on manual user input or automated criteria pre-established by the user. The process may begin by receiving a call (step 502). The call is intercepted before the applicable communications device rings or otherwise alerts the user that the call is incoming.

Next, the wireless device retrieves an identifier associated with the caller (step 504). The identifier may be retrieved using caller identification information or by electronically scanning or searching the control information used to make the call. The wireless device may retrieve any number of identifiers based on the call or communication. The wireless device determines whether the identifier is on a preferred caller list (step 506). The determination of step 506 is made by comparing the one or more identifiers retrieved in step 504 and comparing the identifiers with the preferred caller list.

If the wireless device determines the identifier is on the preferred caller list, the wireless device connects the call to the user (step 508). The call is connected to the user because the user has previously established that the caller is authorized to contact the user under the circumstances.

If the wireless device determines the identifier is not included on the preferred caller list in step 506, the wireless device determines whether the call is an emergency (step 510). The determination of step 510 may be made based on input from the user. For example, a voice or text prompt may ask "Is this call an emergency? If yes, press 9, if no, press 1." The determination may then be made based on the numeric input form the user. If the wireless device determines the call is not an emergency, the wireless device connects the call to the user's voicemail (step 512). The call is passed to the voicemail so that the user may retrieve messages at the user's discretion. In another embodiment, the call may be terminated, played a pre-recorded message, or otherwise processed in response to determining the identifier is not included on the list. If the wireless device determines the call is an emergency in step 510, the wireless device connects the call to the user (step 508).

Figure 6:
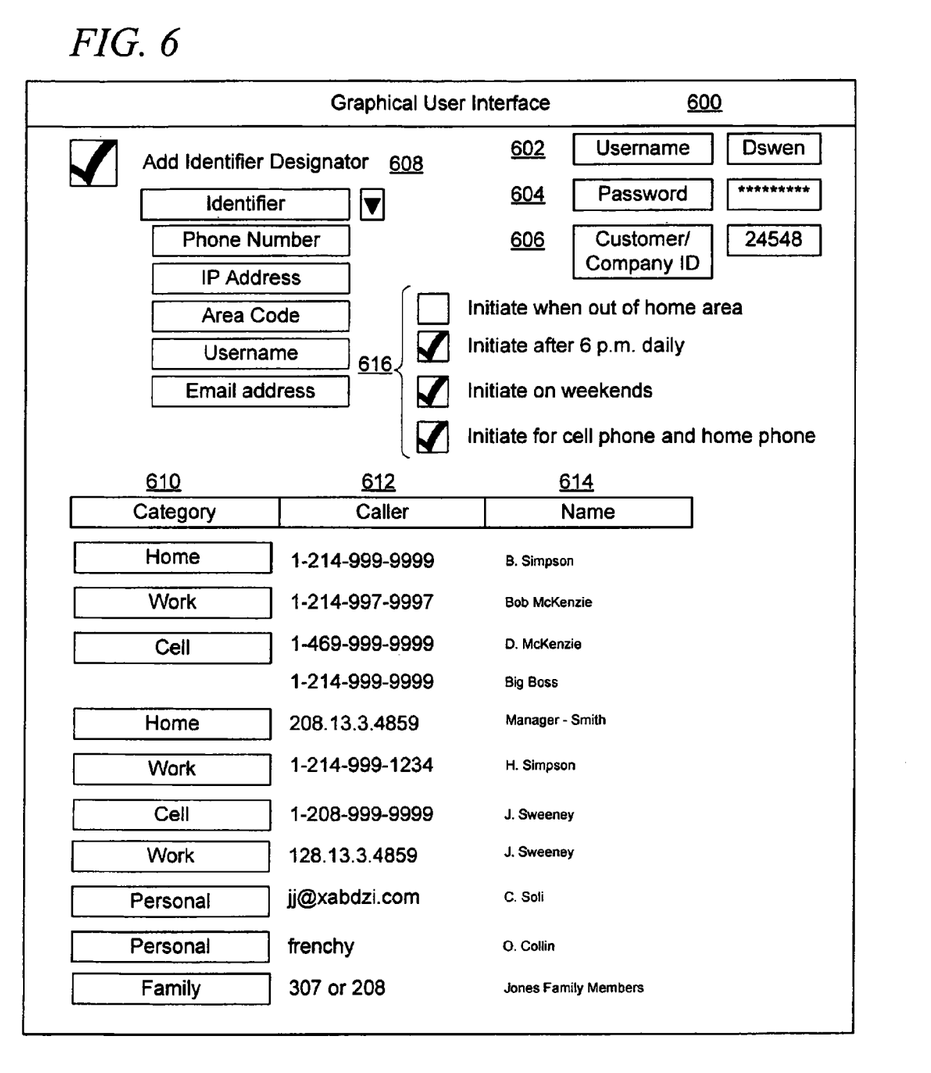
FIG. 6 is a graphical user interface for controlling a preferred caller list in accordance with an illustrative embodiment.

FIG. 6 is a graphical user interface for controlling a preferred caller list in accordance with an illustrative embodiment. The graphical user interface 600 is one embodiment of an interface that may be accessible to a user. The graphical user interface 600 may include any number of elements or components including a username 602, password 604, customer code 606, add identifier designator 608, category 610, caller 612, name 614, and conditional criteria 616. The graphical user interface 600 may be displayed to a user using a remote client or wireless device 114, both of FIG. 1.

The graphical user interface 600 may be used to display and manage a preferred caller list and preferences associated with a call gating feature. The graphical user interface 600 may also be part of an interactive message, such as an email message, SMS message, printout, or information otherwise electronically available to the user.

In one embodiment, the graphical user interface 600 may be displayed to the user only if the user has signed up for or subscribed to a call gating or preferred caller list feature. The features of the graphical user interface 600 may provide a method of managing incoming communications and limiting those communications to communications that are deemed acceptable through the selected preferences. As a result, the user may have greater peace from unwanted or unnecessary communications and increased ability to focus on other projects, tasks, and activities.

In one embodiment, the graphical user interface 600 may be part of a web browsing application with content populated by a communications service provider such as website 302 of FIG. 3. Alternatively, the graphical user interface 600 may be printed in the form of a preferred caller list that may be sent to the user monthly with other invoice information. The graphical user interface 600 may also be integrated in an email that is sent to the user at the end of a billing cycle.

The user name 602, password 604 and customer code 606 may be used by a website or authentication system to determine whether a user may access the graphical user interface 600. The customer code 606 may be the code provided to bill calls and access the account. The graphical user interface 600 may be used to configure the preferred caller list, manage preferences or otherwise allow interaction between the user and the devices and services of the communications service provider.

The add identifier designator 608 may be used to add new identifiers for each potential caller. The identifiers may include any number of pre-set identifiers including phone numbers IP addresses, area codes, usernames, email addresses, and other identifiers, fields or criteria. The add identifier designator 608, category 610, caller 612, and name 614 may include pre-set information or data and information that is extracted from the applicable communications device or communication history. Alternatively, the fields of the graphical user interface 600 may be customized or user entered to fit the needs of the user. The category 610 may be an optional designator that may specify the applicable use of the identifier and may be information that is used and reviewed by the user for organizing the preferred caller list.

The caller 612 lists the applicable identifier. A number of identifiers may be listed for each caller 612. For example, the user may want family members to be able to call or communicate regardless of whether they are calling from their cell phones, work phones, or home phones and as a result each separate identifier may be entered. The name 614 may allow a user to specify a name or other indication of the caller's name. The name 614 may also be extracted from caller identification information based on the identifier entered as the caller 612.

In one embodiment, the user may also be able to disable or enable a feature that enables a communication to be connected to the user if it is determined to be an emergency. For example, using the graphical user interface 600, the user may record a prompt. In another embodiment, the user may implement an emergency feature that may be used by individuals that have received the code from the user.

The conditional criteria 616 may include additional details for initiating and implementing the call gating feature. The conditional criteria 616 may specify preferences for one or more preferred caller lists, devices for which the lists are activated, and times, locations, and events that trigger activation or deactivation as previously described.

The previous detailed description is of a small number of embodiments for implementing the invention and is not intended to be limiting in scope. The following claims set forth a number of the embodiments of the invention disclosed with greater particularity.

What is claimed:

1. A server configured to limit communications, the device comprising:
   a processor for executing a set of instructions;
   a memory in communication with the processor for storing the set of instructions, wherein the set of instructions are executed to:
   receive a list of one or more communicating parties that are authorized to communicate with a user at any time, receive a selection to limit communications, determine whether an identifier associated with a communicating party is in the list in response to processing a communication, wherein the communication is a real-time communication or a message, prevent the communication from being communicated to a communications device in response to determining the identifier is not in the list, wherein the communication is diverted if the communication is the real-time communication, and wherein the communication is queued for subsequent delivery to the communications device if the communication is the message; and connect the communication to the communications device in response to determining the identifier is in the list.

2. The server according to claim 1, wherein the list is saved in a database accessible to the user through a graphical user interface, and wherein the message is a non-real-time message.

3. The server according to claim 2, wherein the graphical user interface is displayed as part of a graphical message interactively displayed to the user.

4. The server according to claim 1, wherein the set of instructions are integrated with a web browser that is remotely accessible by the user.

5. The server according to claim 1, wherein the list is configured to include IP addresses, phone numbers, email addresses, user names, and communications identifiers.

6. The server according to claim 1, wherein the identifier is a name or area code.

7. The server according to claim 1, wherein the identifier is entered by the user.

8. The server according to claim 1, wherein the identifier is enabled to be user input from the user or conditional criteria pre-established by the user.

9. The server according to claim 8, wherein the conditional criteria include at least conditions for automatically limiting communications utilizing days, times of day, locations, and events.

10. The server according to claim 1, wherein the set of instructions is configured to allow the communication in response to the communicating party affirmatively identifying the communication as an emergency.

11. A method for limiting communications, the method comprising:
receiving a list of one or more communicating parties that are authorized to communicate with a user at any time;
receiving a selection to limit communications;
determining whether an identifier associated with a communicating party is on the list in response to receiving a communication, wherein the communication is a real-time communication or a message;
preventing the communication from being communicated to a communications device in response to determining the identifier is not in the list, wherein the communication is diverted if the communication is the real-time communication, and wherein the communication is queued for subsequent delivery to the communications device if the communication is the message; and
connecting the communication to the communications device in response to determining the identifier is on the list.

12. The method according to claim 1, further comprising:
determining whether the communication is an emergency; and
connecting the communication to the communication device in response to receiving an affirmative indication from the communicating party indicating the communication is an emergency.

13. The method according to claim 2, further comprising:
connecting the real-time communication to voicemail in response to affirmatively determining the communication is not an emergency.

14. The method according to claim 1, further comprising:
connecting the real-time communication to voicemail in response to determining the identifier is not on the list.

15. The method according to claim 1, wherein the identifier is enabled to be an IP address, a phone number, an email address, a user name, and a communications identifier.

16. The method according to claim 1, wherein the identifier is any of a communicating party identification, user name, e-mail address, Internet protocol address, and area code.

17. The method according to claim 1, further comprising:
limiting the communication in response to user input from the user conditional criteria pre-established by the user, wherein the message is a non-real-time message.

18. The method according to claim 17, wherein the conditional criteria include at least conditions for automatically limiting communications utilizing days, times of day, locations, and events.

19. A communication system for limiting communications, the system comprising:
a server configured to receiving communications from a communications network, wherein the server includes logic configured to receive a list of one or more communicating parties that are authorized to communicate with a user at any time, receive a selection to limit communications, determine whether an identifier associated with a communicating party is in the list in response to processing a communication, wherein the communication is a real-time communication or a message, reject the communication in response to conditional criteria set by the user and determining the identifier is not on the list, wherein the communication is diverted if the communication is the real-time communication, and wherein the communication is queued for subsequent delivery to the communications device if the communication is the message; and connect the communication to a communications device in response to determining the identifier is in the list; and
the communications device in communication with the server configured to receive at least a portion of the communications from the server.

20. The communication system according to claim 19, wherein logic prompts a user to affirmatively indicate whether the communication is an emergency, and wherein the communication is passed to the communications device in response to the user affirmatively indicating the communication is an emergency.

* * * * *